(12) United States Patent
Van Reenen et al.

(10) Patent No.: US 11,519,845 B2
(45) Date of Patent: Dec. 6, 2022

(54) DEVICE FOR USE IN FLUID SAMPLE ANALYSIS

(71) Applicant: SIEMENS HEALTHINEERS NEDERLAND B.V., The Hague (NL)

(72) Inventors: Alexander Van Reenen, Vught (NL); Markus Hendrikus Van Roosmalen, Berkel-Enschot (NL); Hendrik Sibolt Van Damme, s-Hertogenbosch (NL)

(73) Assignee: Siemens Healthineers Nederland B.V., The Hague (NL)

( * ) Notice: Subject to any disclaimer, the term of this patent is extended or adjusted under 35 U.S.C. 154(b) by 1034 days.

(21) Appl. No.: 16/301,990

(22) PCT Filed: May 16, 2017

(86) PCT No.: PCT/EP2017/061682
§ 371 (c)(1),
(2) Date: Nov. 15, 2018

(87) PCT Pub. No.: WO2017/202643
PCT Pub. Date: Nov. 30, 2017

(65) Prior Publication Data
US 2020/0309675 A1    Oct. 1, 2020

(30) Foreign Application Priority Data
May 23, 2016  (EP) .................................... 16170843

(51) Int. Cl.
*G01N 21/03*        (2006.01)
*B01L 3/00*         (2006.01)

(52) U.S. Cl.
CPC ...... *G01N 21/0303* (2013.01); *B01L 3/50273* (2013.01); *B01L 3/502715* (2013.01);
(Continued)

(58) Field of Classification Search
CPC ........ G01N 21/0303; G01N 2021/0346; B01L 3/502715; B01L 3/50273; B01L 2300/06;
(Continued)

(56) References Cited

U.S. PATENT DOCUMENTS 7,670,559 B2    3/2010  Chien
2006/0216195 A1  9/2006  Blankenstein
(Continued)

FOREIGN PATENT DOCUMENTS

CN      105264358 A  *  1/2016  ......... G01N 21/6458
EP         2281631 B1 * 12/2016  ........ B01L 3/502715
(Continued)

*Primary Examiner* — Ryan D Walsh
(74) *Attorney, Agent, or Firm* — Dugan & Dugan, PC

(57) ABSTRACT

The present invention relates to a device (10) for use in fluid sample analysis. It is described to position (310) a top part (20) of the device (10) adjacent to a base part (30) of the device so as to define a fluidic receiving region in between, the top part being provided with a through opening fluidly connected to the fluidic receiving region, and the bottom part being provided with a radiation window adjacent to the fluidic receiving region. A fluidic sample is supplied (320) through the opening (24). The fluidic sample is moved laterally (330) in the fluid receiving region without the use of an intermediary membrane between the top part and the base part. A radiation is emitted (340) to the fluid receiving region. A radiation is detected (350) that is reflected by the device. A presence of the fluidic sample is determined (360) on the basis of a measured reflectance value based on the detected radiation.

15 Claims, 6 Drawing Sheets

(52) U.S. Cl.
CPC ... *B01L 2300/06* (2013.01); *B01L 2300/0809* (2013.01); *B01L 2300/0851* (2013.01); *B01L 2300/168* (2013.01); *B01L 2400/0406* (2013.01); *B01L 2400/049* (2013.01); *G01N 2021/0346* (2013.01)

(58) Field of Classification Search
CPC ..... B01L 2300/0809; B01L 2300/0851; B01L 2300/168; B01L 2400/0406; B01L 2400/049
See application file for complete search history.

(56) References Cited

U.S. PATENT DOCUMENTS

| | | |
|---|---|---|
| 2011/0253224 A1 | 10/2011 | Linder |
| 2013/0214040 A1 | 8/2013 | Beerling |
| 2016/0025715 A1* | 1/2016 | DiMagno ........... G01N 27/3272 506/9 |
| 2018/0264464 A1* | 9/2018 | Greet ................... B01L 3/5023 |

FOREIGN PATENT DOCUMENTS

| | | | | |
|---|---|---|---|---|
| JP | 10197526 A * | 7/1998 | | |
| JP | 2003004752 A | 1/2003 | | |
| JP | 2004150805 A * | 5/2004 | ........ | B01L 3/502715 |
| JP | 2005172532 A | 6/2005 | | |
| JP | 2005172533 A | 6/2005 | | |
| WO | WO-2007002480 A2 * | 1/2007 | ........ | B01L 3/502715 |
| WO | 2009112038 A2 | 9/2009 | | |

\* cited by examiner

1. Blood Platform Blood Housing (Filter Housing)
2. Blood Platform Assembled Blood Housing (+filter)
3. Blood Platform RFiD
4. Blood Platform Laminate
5. Blood Platform Base Part

| 3d-printed |||||
|---|---|---|---|---|
| Standard design | Small "Circular Hole" design with small top insert | Large "Oval Hole" design | |
| A | B1 | C1 | D |
|  |  |  |  |
|  |  |  |  |
| | Small "Circular Hole" large top insert | Small "Oval Hole" design | |
| | B2 | C2 | |
| |  |  | |
| |  |  | |

DEVICE FOR USE IN FLUID SAMPLE ANALYSIS

CROSS-REFERENCE TO PRIOR APPLICATIONS

This application is the U.S. National Phase application under 35 U.S.C. § 371 of International Application No. PCT/EP2017/061682, filed on May 16, 2017, which claims the benefit of European Patent Application No. 16170843.3, filed on May 23, 2016. These applications are hereby incorporated by reference herein.

FIELD OF THE INVENTION

The present invention relates to a device for use in fluid sample analysis, system for fluid sample analysis, and to a method for use in fluid sample analysis, as well as to a computer program element and a computer readable medium.

BACKGROUND OF THE INVENTION

Fluid sample analysis is performed using a disposable cartridge within which the fluid sample is supplied, and an analyser within which the cartridge is inserted for diagnostic testing. For a test, the cartridge is inserted into the analyser and a sample fluid is added to the sample interface of the cartridge. The sample fills a cartridge, after which the analyser starts the measurement. A filtering membrane is provided within the cartridge, which has a filtering function and also transfers the sample to a measurement zone via wicking. Before starting the sample analysis, a preliminary check is made to determine whether a fluid sample is actually in the cartridge. Wetting of the membrane by blood or plasma is used to detect if a sample has been added. Detection that sample is present is via a visual inspection of a change in colour of the membrane and/or a change in reflectivity of the membrane upon wetting. When the analyser makes the preliminary check, detection of the sample is performed via detection of light reflected from the filtering membrane, which changes its optical properties when blood has been taken up within the membrane. If the membrane is not present, not only is sample fluid not transferred to the measurement zone there is insufficient reflected light for a preliminary check to be made indicating whether the sample is present or not.

In U.S. Pat. No. 7,670,559B2, microfluidic devices and systems having enhanced detection sensitivity, particularly for use in non-fluorogenic detection methods, e.g., absorbance, are described. The presence of a fluid is detected directly within a microfluidic channel.

However, there may still be a need to detect that a sample is present and that the sample is then available for analysis.

SUMMARY OF THE INVENTION

It would be advantageous to have an improved technique for fluid sample analysis.

The object of the present invention is solved with the subject matter of the independent claims, wherein further embodiments are incorporated in the dependent claims. It should be noted that the following described aspects of the invention apply also for the device for use in fluid sample analysis, system for fluid sample analysis, and to the method for use in fluid sample analysis, as well as to a computer program element and a computer readable medium.

According to a first aspect, there is provided a device for use in fluid sample analysis, comprising:
a top part;
a base part.

The top part is configured to be positioned adjacent the base part so as to define a fluid receiving region in between. The top part has a through opening so as to enable fluid connection with the fluidic region. The base part comprises a fluid receiving surface. A radiation window extends from at least a part of the fluid receiving surface. When the top part is positioned adjacent to the base part, the device is configured such that a fluidic sample supplied through the opening is moved laterally in the fluid receiving region over the fluid receiving surface without the use of an intermediary membrane. The device further comprises a radiation receiving area that is at least partially reflective to at least one wavelength of the radiation, positioned such that at least a part of the fluid receiving region is located between the radiation receiving area and the fluid receiving surface when the top part is positioned adjacent to the base part.

In this way, radiation entering the bottom surface of the base part and received and reflected from the radiation receiving area is useable to determine the presence of the fluidic sample within the device. Also, presence of a fluidic sample can lead to absorption of all the radiation that enters the device, and in this manner a lack of detected radiation can be used to indicate the presence of the fluidic sample within the device.

In this manner, the fluidic sample is not detected within the hole through which the sample is supplied into the device, but through a reduced radiation reflection from the device housing itself, because the fluidic sample can spread and cover the device housing, which disrupts the reflection of light. Therefore, not only is a sample detected, but the sample necessarily has flowed within the device and as such can be considered to have characteristics that also enable the fluid to flow to an analysis zone of the device, for example via a capillary channel. In the following, "fluidic sample" means a "fluid sample", and vice versa.

In this manner, a membrane or filter as used in normal devices for sample analysis is not required. This means that the device can be made cheaper as the membrane is not required. This also means that as wetting and take up of the membrane is not required, a smaller sample volume can be used. Also, this leads to a faster time taken to indicate that a sample is present or not. Additionally, it de-risks the probability that a measurement by the device fails because too little sample was added to the device (cartridge).

To put this another way, a fluid zone is provided between the base part and top part, and fluid is caused to flow across a fluid receiving surface of the base part, and no intermediate filter or membrane is present within this fluid zone. Radiation is then (partially) transmitted through this fluid zone, and reflected from a reflective radiation receiving area, that could be the bottom or top of the top part of the device or even a reflective layer placed over the top of the top part of the device. The intensity of detected radiation when no sample is present is different to that when a sample is present, with the intensity being reduced when the sample is present. The intensity of detected radiation when a sample has been supplied to the device can be used to provide a reflectance value that is used to determine that a sample is present within the device, in terms of having correctly flowed to a region from which a sub-sample will in all probability then be available for analysis.

In an example, a centre of the opening defines a first axis substantially perpendicular to a bottom surface of the top part. Also, a centre of the radiation receiving area defines a second axis substantially perpendicular to the bottom surface of the top part. When the top part is positioned adjacent to the base part a distance separating the first axis from the second axis is greater than a distance separating the first axis from an inner edge of the opening.

In this way, a standard system can be used that detects presence of a sample through absorption of radiation that enters the base part and exits the hole, but now the size of the hole has been reduced such that radiation can be received from and reflected internally within the device to be detected on the same side of the device as radiation source.

Also, a substantial reflecting surface area is provided away from the opening, such that radiation can propagate back and forth through a region that a fluid sample can flow into, thus leading to an increase in the intensity of the reflected signal, thereby enabling a filtering membrane to be dispensed with.

In an example, an area of a bottom surface of the top part defines the radiation receiving area.

This leads to a simplified more cost effective device, as no separate reflecting component is required in addition to the top part and base part.

In an example, the fluid receiving region is configured such that lateral movement of a fluid sample is at least partly induced by a capillary force.

In this way, no intermediate membrane is required that spreads out a fluid sample due to wetting of the membrane. Rather, the fluid sample moves, for example spreads out, (at least in part) under capillary action. This also means that the volume of the sample need not be too large.

In an example, the fluid receiving region is configured such that lateral movement of a fluidic sample is at least partly induced by a sucking action without the use of an active pump.

In this way, no intermediate membrane is required that spreads out a fluid sample due to wetting of the membrane. Rather, the fluid sample moves, for example spreads out, (at least in part) under a sucking action. This also means that the volume of the sample need not be too large. Furthermore, increased lateral motion of the fluid sample is provided, and the fluid motion can be more controlled.

In an example, a sample container is provided on a bottom surface of the top part and/or on a top surface of the base part, such that the fluid receiving region is substantially parallel sided volume defined by the bottom surface of the top part, the top surface of the base part, and the sample container.

In this manner, the volume of the sample supplied to the device can be consistent with that required to fill the volume, and where filling of the volume with sample fluid leads to a maximum amount of attenuation of radiation crossing to and fro the volume. This is because all the radiation paths twice cross through a maximum path length of fluid sample for each ray path.

In an example, the opening is circular.

In this way, the circular shape confines the centre of delivery of the sample such that the centre of delivery does not occur to the side of the capillary channel, and occurs at the correct position along the axis of the capillary channel.

In an example, the opening has a width that is greater than a length.

In this way, the shape confines the centre of delivery of the sample such that the centre of delivery does not occur to the side of the capillary channel, and occurs at a position along the axis of the capillary channel.

In an example, the opening has a cross sectional area substantially matched to the cross sectional area of a sample delivery device.

In this manner, the sample delivery device can be inserted into the opening, but the centre of delivery of the sample occurs at the correct position.

In an example, the fluid receiving surface has an area, and the opening has a cross sectional area substantially less than the area of the fluid receiving surface.

In this manner, detection of a reflectance value indicating the presence of the fluid sample also indicates that the fluid is moving laterally in a relatively free manner, and as such is expected to be suitable for analysis. For example, such a fluid is expected to also have moved along a capillary channel to an analysis zone.

In a second aspect, there is provided a system for fluid sample analysis, comprising:

a radiation source;

a device for use in fluid sample analysis according to the first aspect;

a radiation detector; and a processing unit.

The radiation source is configured to provide the radiation. The radiation detector is configured to detect a radiation reflected from the radiation receiving area. The processing unit is configured to determine the presence of a fluid sample within the device on the basis of a reflectance value derived from the radiation reflected from the radiation receiving area.

In this manner, prior to analysis of the fluid sample a determination can be made that a sample is present in the device and that a sample is ready to be analyzed.

In an example, the reflectance value is determined on the basis of an intensity of radiation when a sample has not been supplied to the device and a detected intensity of radiation when a sample has been supplied to the device.

According to a third aspect, there is provided a method for use in fluid sample analysis, comprising:

a) positioning a top part of a fluidic device adjacent to a base part of the fluidic device so as to define a fluidic receiving region in between, the top part being provided with a through opening fluidly connected to the fluidic receiving region, and the bottom part being provided with a radiation window adjacent to the fluidic receiving region;

b) supplying a fluidic sample through the opening;

c) moving the fluidic sample laterally in the fluid receiving region without the use of an intermediary membrane between the top part and the base part;

d) emitting a radiation to the fluid receiving surface e) detecting a radiation that is reflected by the device; and f) determining a presence of the fluidic sample on the basis of a measured reflectance value based on the detected radiation.

In an example, an area of a bottom surface of the top part defines a radiation receiving area which is at least partly reflective to the wavelengths of the radiation.

According to another aspect, there is provided a computer program element for controlling a device or system as previously described which, when the computer program element is executed by a processing unit, is adapted to perform the method steps as previously described.

According to another aspect, there is provided a computer readable medium having stored the computer element as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
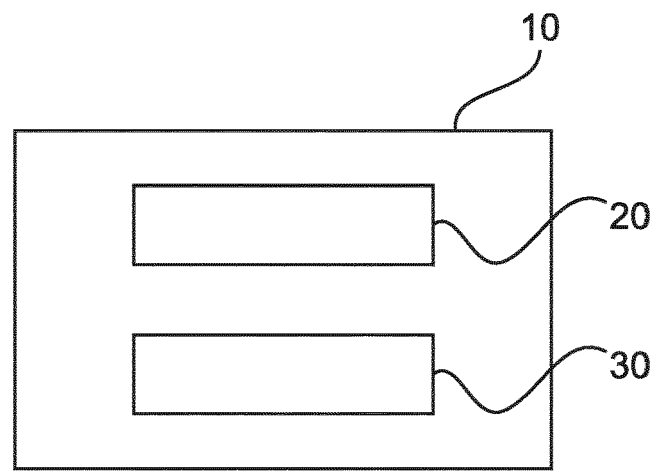
FIG. 1 shows a schematic set up of an example of a device for use in fluid sample analysis.
Figure 2:
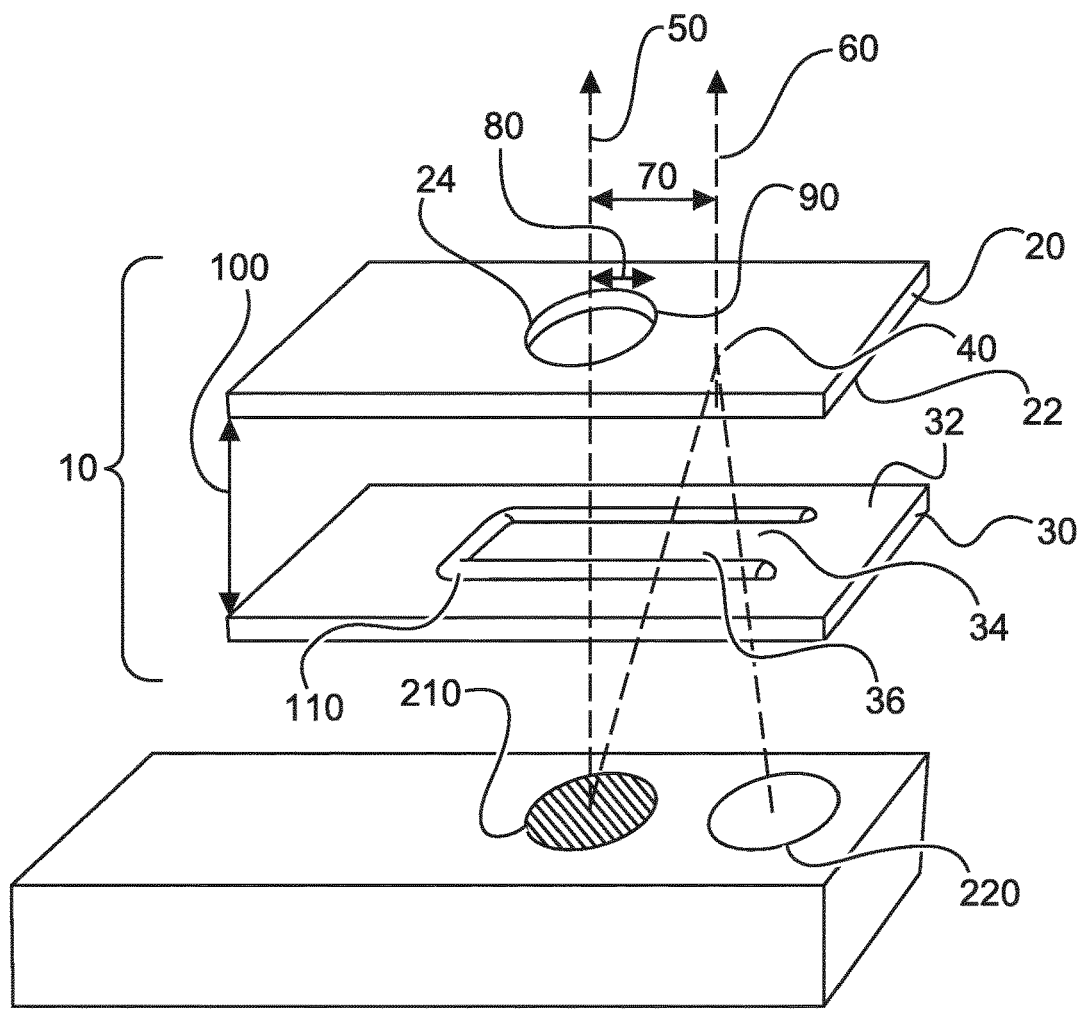
FIG. 2 shows a schematic set up of an example of a device for use in fluid sample analysis.

FIGS. 1 and 2 show a device 10 for use in fluid sample analysis. The device 10 comprises a top part 20, and a base part 30. The top part 20 is configured to be positioned adjacent to the base part 30 so as to define a fluid receiving region 100 in between. The top part 20 has a through opening 24 so as to enable fluid connection with the fluidic receiving region. A fluid sample is not shown in FIG. 1, but can be seen in FIG. 6. The base part 30 comprises a fluid receiving surface 34, and a radiation window 36 extending from at least a part of the fluid receiving surface 34. When the top part 20 is positioned adjacent to the base part 30, the device 10 is configured such that a fluidic sample supplied through the opening 24 is moved laterally in the fluid receiving region over the fluid receiving surface 34 without the use of an intermediary membrane. The device further comprises a radiation receiving area 40 that is at least partially reflective to at least one wavelength of the radiation. The radiation receiving area 40 is positioned such that at least a part of the fluid receiving region is located between of the radiation receiving area and the fluid receiving surface 34 when the top part 20 is positioned adjacent to the base part 30.

In an example, lateral movement of the fluid sample comprises spreading of the fluid sample. In an example, the fluid sample spreads in the fluid receiving region as the fluid sample is provided to the fluid receiving surface, such that the fluid sample extends substantially, or completely, back to the part of the fluid receiving surface to which is was first received.

In an example, lateral movement of the fluid sample comprises displacement of the fluid sample. In other words, the fluid sample can move as a droplet (which could be a flattened and/or elongated droplet) laterally in the fluid receiving region.

In an example, a fluid sample is blood. In an example, the fluid sample is serum. In an example, the fluid sample is urine. In an example, the fluid sample is water which may contain contaminants.

In an example, the through opening has an area of 5 $mm^2$. In an example, the through opening has an area of 1 $mm^2$. In an example, the through opening has an area of 2 $mm^2$. In an example, the through opening has an area of 25 $mm^2$. In an example, the through opening has an area less than 1 $mm^2$. The through opening can be circular, elliptical, rectangular, square, or any other shape as required.

In an example, the fluid receiving surface has an area that is two to three times the area of the through opening.

In an example, the through fluid receiving surface has an area of 25 $mm^2$. In an example, the through fluid receiving surface has an area of 100 $mm^2$. In an example, the through fluid receiving surface has an area of 1 $mm^2$. In an example, the through fluid receiving surface has an area that is less than 1 $mm^2$, however in such a situation the cross sectional area of the through opening needs to be very small in terms of being less than the area of the fluid receiving surface. The fluid receiving surface can be of any shape, for example circular, elliptical, rectangular, square or any other shape as required.

In an example, the at least one wavelength is selected dependent upon the fluid sample. In this way, radiation can be used that suffers high absorption when passing through the sample. This can enable a reduced area of fluid receiving surface to be needed over which the fluid sample moves in order for the sample to be detected, or for a set size of fluid receiving surface the increased absorption will lead to an increased reflectivity change and to an increase in signal to noise.

In an example, when no sample is present a first radiation signal can be measured, and when a sample is present, and correctly presented within the device, a second (different) radiation signal can be measured and this enables the presence of the sample within the device to be determined. The second radiation signal could be a null signal indicating that all the radiation has been absorbed. In other words, a change in optical reflection properties of the device with and without a fluid sample is used to detect the sample, and to also determine that an analysis measurement is likely to be feasible. An analysis measurement is probable, because the fluid has characteristics that has led to its flow over the fluid receiving surface, and this also means that it will also be likely to have flowed to a measurement zone, for example via a capillary channel.

According to an example, a centre of the opening 24 defines a first axis 50 substantially perpendicular to a bottom surface 22 of the top part 20. Also, a centre 42 of the radiation receiving area 40 defines a second axis 60 substantially perpendicular to the bottom surface 22 of the top part 20. When the top part is positioned adjacent to the base part 30 a distance 70 separating the first axis from the second axis is greater than a distance 80 separating the first axis from an inner edge 90 of the opening.

According to an example, an area of a bottom surface 22 of the top part 20 defines the radiation receiving area 40.

In an example, a capillary channel runs within the top surface of the base part or the bottom surface of the top part, from a position within these respective surfaces close to the area of the opening, to an analysis zone. The capillary channel is configured to transfer some of the fluid sample to the analysis zone. In an example, the radiation receiving area is located in the bottom surface of the top part on the side of the opening towards the analysis zone. In this manner, detection of a fluid sample indicates that the fluid has flowed in the direction of the capillary channel, and therefore is more likely to lead to a successful sample analysis.

According to an example, the fluid receiving region 100 is configured such that lateral movement of a fluid sample is at least partly induced by a capillary force.

In an example, the spacing between the bottom surface of the top part and the top surface of the base part is dependent upon the specific fluid being analysed. For example, the spacing for blood can be different to the spacing for urine, with such spacing determined such that the flow of the fluid under capillary action is as required. In an example, the spacing between the bottom surface of the top part and the top surface of the base part is 0.05 mm. In an example, the spacing between the bottom surface of the top part and the top surface of the base part is 0.1 mm. In an example, the spacing between the bottom surface of the top part and the top surface of the base part can be 1 mm, 2 mm or any value between any of these values. In some situations, the spacing can be less than 0.05 mm, and in other situations greater than 2 mm.

In an example, the bottom surface of the top part is configured such that the flow of the sample across the bottom surface of the top part is not substantially inhibited.

In an example, the bottom surface of the top part is substantially flat.

In an example, bottom surface of the top part is hydrophobic.

In an example, the top surface of the base part is configured such that the flow of the fluid sample across the top surface of the base part is not substantially inhibited. In an example, the top surface of the base part is substantially flat. In an example, the top surface of the base part is hydrophobic.

In an example, the portion of the top surface of the base part is substantially flat.

In an example, the portion of the top surface of the base part is hydrophobic.

In this manner, the sample can spread out more effectively and quickly in less time and requiring a smaller volume. And if the bottom surface is positioned close enough to the top surface of the bottom part, additionally capillary action leads to more effective spreading of the fluid. This is further helped, if the bottom surface of the top part is also suitable flat.

According to an example, the fluid receiving region is configured such that lateral movement of a fluidic sample is at least partly induced by a sucking action without the use of an active pump. In other words, the device is configured such that the fluid sample is sucked in the lateral direction (with respect to the central axis of the through hole), without an active pump.

In an example, fluidic guides are provided within or on the bottom surface of the top part to enable the sucking action of the fluid away from the central axis of the through hole. In an example, fluidic guides are provided within or on the top surface of the base part to enable the sucking action of the fluid away from the central axis of the through hole. In an example, the fluidic guides are formed as molded microgrooves on or within the surfaces. In this way in addition to providing for increased movement of the fluid, which can augment or replace that caused by capillary action, the sucking action (through for example fluidic guides) can be used to better control the fluid flow. In this way, the increased flow can be directed toward the capillary channel that leads to the reaction chamber, and this means that less fluid needs to be applied to the device.

In an example, the bottom surface of the top part is hydrophilic. In an example, the top surface of the base part is hydrophilic. The surface of the top part and/or base part can be hydrophilized through application of a hydrophilic material or a material, such as for example Vitrostealth, which can be deposited on the surface. The spacing between the surface when one or both are hydrophilized can 0.05 mm, 0.1 mm, 1 mm, 2 mm or greater or less than these figures or between these figures. Regarding the situation when neither surface is hydrophilized, when one or both surfaces are hydrophilized, the spacing between surfaces may need to be changed for a particular fluid sample in order to provide for the required lateral movement of the fluid.

In this way, if the distance between the surfaces is small (<~1 mm), capillary forces can be the main mechanism leading to lateral movement of the sample (for example spreading). As the distance between the surfaces becomes larger, then the hydrophilicity of the top part or the base part can be used to also enable sufficient lateral movement of the sample (for example spreading), as the capillary mechanism reduces due to the increased separation. This means that flexibility of design is provided, where different distances between the surfaces of the device can be provided dependent upon the samples being analysed, with capillary and/or sucking action used to laterally move the fluid sample as required.

In an example, the radiation receiving area is configured to be reflective for at least one wavelength of the first radiation. In an example, the radiation receiving area is configured to be reflective over a range of wavelengths, for example over the range of visible light—white.

This means that the reflected signal is increased, meaning that the absolute change in signal between a fluid being there or not being there is increased, leading to improvements in signal to noise.

In an example, the radiation receiving area is coloured white. This provides a very cost effective means for increasing the signal.

In an example, the radiation is a first subset of a radiation beam, wherein a second radiation forms a second subset of the radiation beam, the second radiation configured to be transmitted through the opening at substantially the same time as the radiation is configured to be is configured to be received and reflected from the radiation receiving area.

This means that the device can be used on existing analysis systems, where radiation is directed through the sample opening supply hole to determine if a sample is present.

According to an example, a sample container 110 is provided on a bottom surface 22 of the top part 20 and/or on a top surface 32 of the base part 30, such that the fluid receiving region is a substantially parallel sided volume defined by the bottom surface of the top part, the top surface of the base part, and the sample container.

In an example, the sample container is a vent ring. In an example, the vent ring forms an almost complete ring or annulus, with a gap for a capillary channel that runs to a sample analysis zone. The capillary channel is formed in the bottom surface of the top part or in the top surface of the base part.

In an example, the sample container is horseshoe shaped, being an annulus with an opening through which fluid can flow.

In an example, the sample container is a protrusion on the bottom surface of the top part, positioned around the opening in the top part.

In an example, when the device is closed the first axis is substantially aligned with the capillary channel, and in an example is substantially aligned with an end of the capillary channel. In this example, aligned means that the first axis bisects an axis of the capillary channel, when the two axes are actually substantially perpendicular to one another when the top part is positioned adjacent to the base part.

In an example, the opening is oval shaped, with a long axis of the oval shape configured to be substantially parallel to an axis of the capillary channel. In this way, the oval shape confines the centre of delivery of the sample such that the centre of delivery does not occur to the side of the capillary channel.

In an example, the sample container defines an area on the top of the base part that is larger than an area of the opening.

In an example, when the bottom surface of the top part is positioned adjacent to the top surface of the base part, the first axis is centred on the centre of an area defined by the sample containment means. A distance separating the first axis from an inner edge of the sample containment means is then greater than the distance separating the first axis from the inner edge of the opening.

According to an example, the opening 24 is circular.

According to an example, the opening 24 has a width that is greater than a length.

In an example, the opening is elliptical.

In an example, the through opening has a depth through the top part such that the width of the opening being sufficiently small in combination with the depth creates capillary suction of the fluid sample. A protrusion surrounding the through opening on the top or outer surface of the top part can be configured to provide the required depth, and can also be used to aid guidance of the pipette. Furthermore, the increased depth or height of the through hole, whether provided by a protrusion or through the thickness of the top part itself, further enables an increased rate of supply of the fluid sample to the device, without fluid coming back out of the opening. The increased rate of supply creates a pressure that is useable to move the fluid sample laterally.

According to an example, the opening 24 has a cross sectional area substantially matched to the cross sectional area of a sample delivery device.

According to an example, the fluid receiving surface 34 has an area, and the opening 24 has a cross sectional area substantially less than the area of the fluid receiving surface.

In an example, a dye can be added to the sample to increase the absorption of light within the sample.

In an example, a salt or dye can be added to the sample, which increases the absorption of light, but which then over a predetermined time limit stops absorbing radiation. In this manner, when no sample is present a first detected light intensity is determined, and then when a sample with a light absorbing dye has flowed within the device a second light intensity is determined, which could be a null signal. Then, as the dye ceases to absorb, the light intensity increases. In this manner, the presence of the sample can be more robustly determined.

Figure 3:
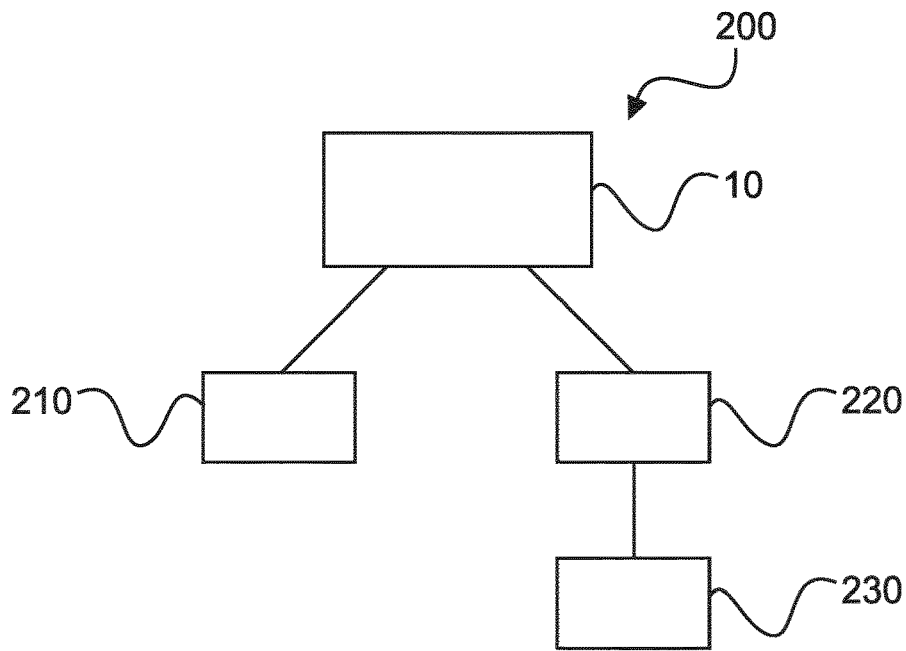
FIG. 3 shows a schematic set up of an example of a system for fluid sample analysis.

FIG. 3 shows a system 200 for fluid sample analysis. The system 200 comprises a radiation source 210, a device 10 for use in fluid sample analysis according to that described with reference to FIG. 1 and/or FIG. 2, a radiation detector 220, and a processing unit 230. The radiation source 210 is configured to provide the radiation. The radiation detector 220 is configured to detect a radiation reflected from the radiation receiving area 40. The processing unit 230 is configured to determine the presence of a fluid sample within the device on the basis of a reflectance value derived from the radiation reflected from the radiation receiving area.

In an example, a baseline radiation intensity value determined when the device is known to be empty can be compared against an intensity value determined when a sample has been supplied to the device. A ratio between these intensities can be used to provide a measured reflectance value, and this used to determine the presence of the fluid sample. In an example, as the fluid sample flows laterally within the device the intensity of detected radiation may start at the level associated with an empty device and gradually fall as the sample flows across the fluid receiving surface to a stable level indicating that the radiation receiving area is covered by the sample (has an intervening sample). In this manner, the appropriate reflectance value can be chosen to determine that the presence of a sample.

In an example, the intensity of radiation exiting the source can be compared against that being detected to provide a reflectance value. This reflectance value then changes depending upon whether there is a fluid sample present within the device or not, and similarly to the situation above can be used to indicate the presence of the fluid sample in the device. In other words, a prior intensity measurement is not required to be referenced against an intensity measurement made when the sample is expected to be present.

According to an example, the reflectance value is determined on the basis of an intensity of radiation when a sample has not been supplied to the device and a detected intensity of radiation when a sample has been supplied to the device.

In an example, the intensity of radiation when a sample has not been supplied to the device comprises a premeasured value. In an example, the intensity of radiation when a sample has not been supplied to the device comprises a detected intensity. In an example, the intensity of radiation when a sample has not been supplied to the device comprises a determined intensity, for example a calculated value.

In an example, an exit orifice of the radiation source is positioned on the first axis.

Figure 4:
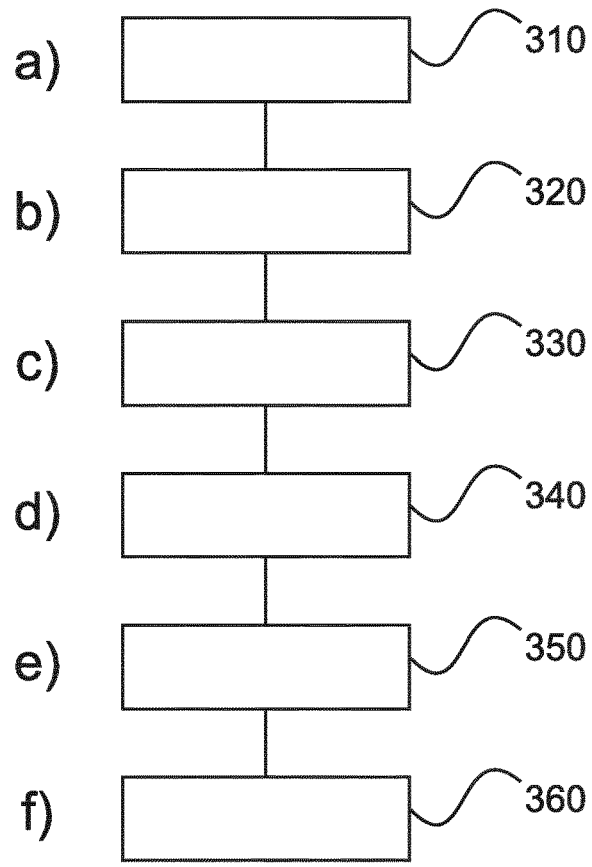
FIG. 4 shows an example of a method for use in fluid sample analysis.

FIG. 4 shows a method 300 for use in fluid sample analysis in its basic steps, the method comprising:

In a positioning step 310, also referred to as step a), a top part of a fluidic device is positioned adjacent to a base part of the fluidic device so as to define a fluidic receiving region in between, the top part being provided with a through opening fluidly connected to the fluidic receiving region, and the bottom part being provided with a radiation window adjacent to the fluidic receiving region;

In a supplying step 320, also referred to as step b), a fluidic sample is supplied through the opening;

In a moving step 330, also referred to as step c), the fluidic sample is moved laterally in the fluid receiving region without the use of an intermediary membrane between the top part and the base part;

In an emitting step 340, also referred to as step d), radiation is emitted to the fluid receiving region;

In a detecting step 350, also referred to as step e), a radiation that is reflected by the device is detected; and In a determining step 360, also referred to as step f), a presence of the fluid sample is determined on the basis of a measured reflectance value based on the detected radiation.

In an example, an area of a bottom surface of the top part defines a radiation receiving area which is at least partly reflective to the wavelengths of the radiation.

In an example, a centre of the opening defines a first axis substantially perpendicular to a bottom surface of the top part; and wherein, a centre of the radiation receiving area defines a second axis substantially perpendicular to a bottom surface of the top part; and wherein when the top part is positioned adjacent to the base part a distance separating the first axis from the second axis is greater than a distance separating the first axis from an inner edge of the opening.

In an example, at least a portion of a top surface of the base part is configured to receive the fluid sample.

In an example, the radiation receiving area is configured to be highly reflective for at least one wavelength of the first radiation.

In an example, the radiation receiving area is coloured white.

In an example, the fluid receiving region is configured such that the lateral movement of the fluid sample is at least partly induced by a capillary force.

In an example, the radiation is a first subset of a radiation beam, wherein a second subset of the radiation beam is configured to be transmitted through the opening at substantially the same time as the first subset of the radiation beam is configured to be is configured to be reflected by the device.

In an example, a sample container is provided on a bottom surface of the top part and/or on a top surface of the base part, such that the fluid receiving region is substantially parallel sided volume defined by the bottom surface of the top part, the top surface of the base part, and the sample container.

In an example, the opening is circular.

In an example, the opening has a width that is greater than a length.

In an example, the opening has a cross sectional area substantially matched to the cross sectional area of a sample delivery device.

In an example, the fluid receiving surface has an area, and the opening has a cross sectional area substantially less than the area of the fluid receiving surface.

Figure 5:
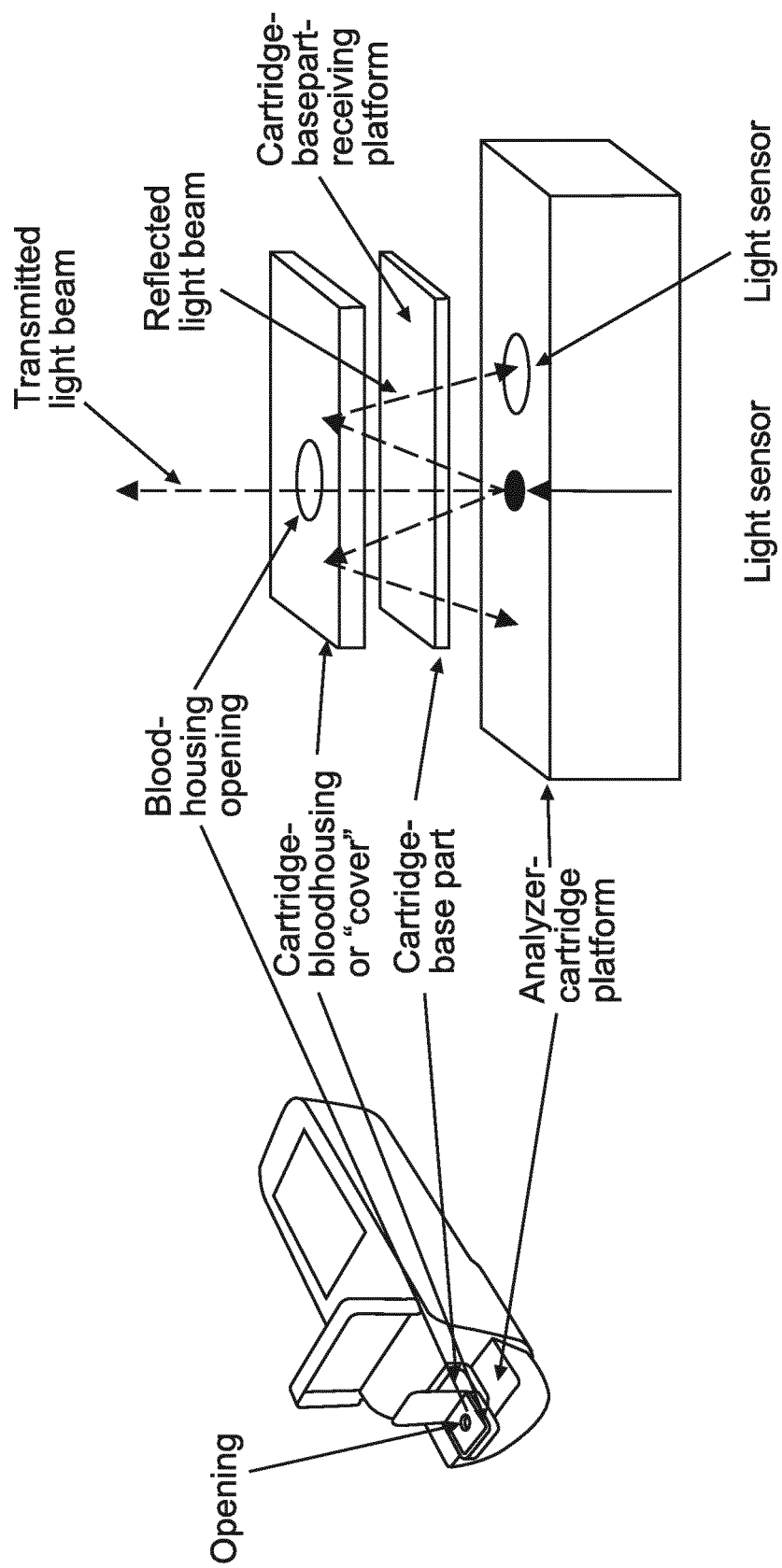
FIG. 5 shows a schematic set up of, and pictorial representation of, an example of a system for use in fluid sample analysis.

FIG. 5 shows on the right hand side a schematic representation of a device, also termed a cartridge, for use in fluid sample analysis along with a representation of an analyzer, and on the left hand side a cartridge is shown inserted into an analyzer. In this example, the fluid sample being analyzed is blood. However, before analyzing the blood a check needs to be made that a sample is actually within the cartridge and is suitably positioned for analysis. A blood sample (not shown) is supplied to the cartridge through the blood housing opening in the cartridge blood housing (also called cover or top part) with a syringe or pipette. The blood sample is received on the cartridge base part receiving platform (base part). The top part is spaced from the base part such that the blood sample spreads laterally between the top part and the base part due to capillary action. The facing surfaces of the top part and base part, between which the blood flows, are smooth and hydroscopic in order to facilitate flow under capillary action. The blood flows to a capillary channel, which transfers some of the blood sample to a reaction chamber for analysis. To determine if the sample is present the device (cartridge) in inserted into the analyser. The analyser has a cartridge platform containing a light source (LED) and a light sensor. The LED is a white light LED, but can be a blue, red or green LED or can be a laser light source. A green light can be especially effective when the sample is blood, because green radiation is absorbed by blood. The base part of the device is partially transparent to the radiation emitted by the LED. The light from the LED passes through the base part, crosses the gap between the base part and the top part, is reflected from the underside of the top part, again crosses the gap between the top part and the base part, again passes through the base part and is detected by a light sensor (photodiode). The opening of the blood housing (top part) forms a sample inlet, and the sample spreads laterally due to capillary action as described above, with fluid moving across the top surface of the base part, which forms a fluid receiving surface. The above described light propagation route then means that light passes through the fluid receiving surface is reflected on a bottom surface of the top part at a radiation receiving area and again passes through the fluid receiving surface and in doing so passes twice through a region where the fluid sample can spread. Without a sample present, the detected intensity of radiation forms a baseline detected value. When a sample is supplied to the device, if the sample has flowed (or moved) due to capillary action over the region where radiation crosses between the base part and the top part, the detected intensity is reduced due to scattering and absorption losses. A comparison with the baseline intensity figure provides a reflectance value and this can be used to determine if the sample is present or not. In the above example, the sample is supplied through the opening in the top part of the device by means of a pipette or capillary tube. However, in an example, the upper surface of the top part has within it a microfluidic channel that leads to the opening, and which is used to transport the fluid sample to the opening and into the device. The fluid sample then enters the device and flows between the bottom surface of the top part and the top surface of the base part under capillary action as described above. Regarding sample detection, an example of the analyzer operates as follows: The LED provides radiation with pulses (on/off). The detector measures both of these pulses, and determines the difference. This signal difference changes upon adding sample. The on/off pulses are compared in order to prevent background light is causing a false trigger. For example, if someone would use a laser to shine upon the sensor, the detector will measure this intensity both during the on and off phase, and thereby not measure a difference.

Figure 6:
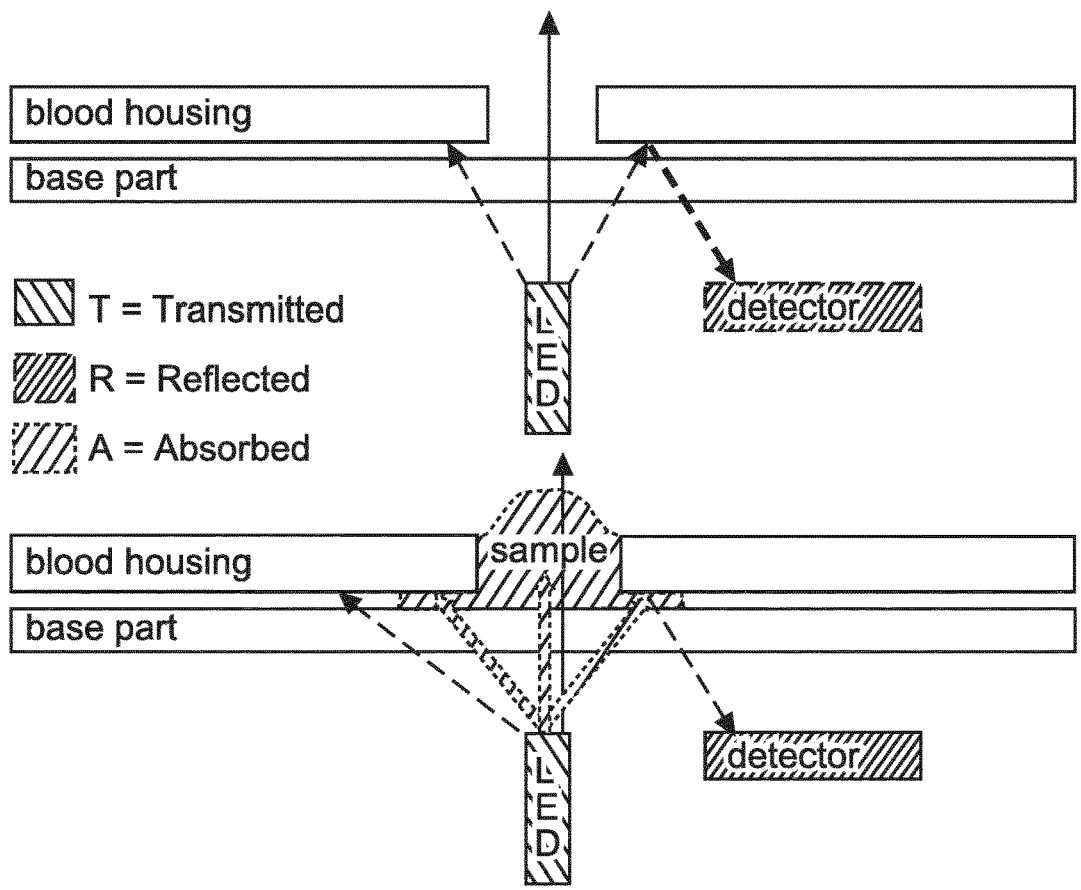
FIG. 6 shows a schematic set up of an example of a device for use in fluid sample analysis.

FIG. 6 shows an expanded view of the device with and without a sample. As shown, when no sample is present because the hole through which the sample is supplied is small the radiation from the source can reflect in an undisrupted manner within the device and be detected. However, even though the hole is small the sample flows under capillary action between the base part and blood housing (top part) and disrupts the reflectance due to absorption and scattering processes, and the fall in signal can be used to indicate that a sample is present. Also, because a capillary channel is used to transfer a part of the sample to a reaction chamber for analysis, detection of the sample in this manner also means that it will also be likely to have flowed down the capillary channel. The capillary channel extends off to one side of the base part (see FIGS. 7 and 9) and the radiation is reflected and detected on this side of the device. In the cartridge (device), the diameter of the sample opening of the blood-housing (top part) is small (reduced over that for existing devices) so that the contribution to the reflected light by the blood-housing (top part) is increased. Furthermore, the top part and base part are positioned relative to each other such that the fluid sample supplied through the small opening is laterally spread or displaced through capillary action between the base part and top part. The fluid sample spreads over a region where radiation propagates to and from a light source to a detector both located in a separate analyser that are positioned below the base part when the cartridge (device) is mounted in an analyser. The radiation propagates through the base part, reflects from the bottom of the top part, and propagates back through the base part to the detector. The surface over which the fluid sample spreads is large enough to disturb the reflected signal, providing a change in signal between a device with no sample present and that where a sample is present and this can be achieved without the need of an intermediary filtering membrane. Indeed, by adding a blood sample to the cartridge, the blood sample fills the area between the base part and the blood-housing (top part), and thereby alters the reflected amount of light, enabling the detection of added sample.

Figure 7:
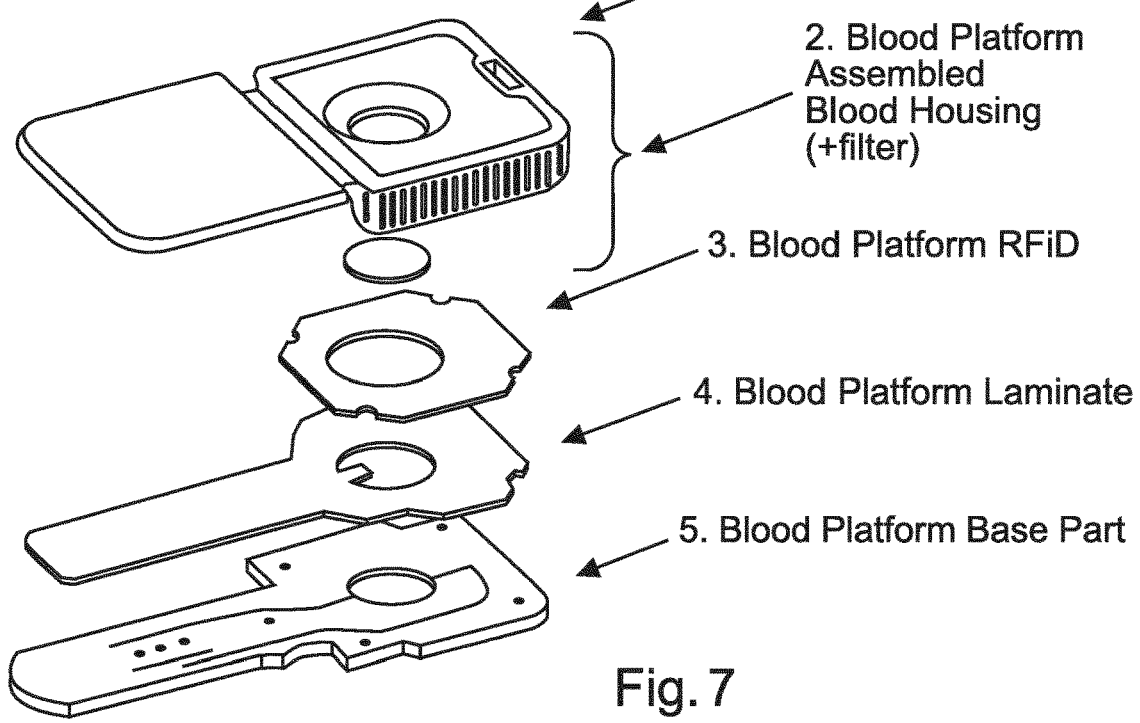
FIG. 7 shows a pictorial representation of parts of an example of a device for use in fluid sample analysis.
Figure 8:
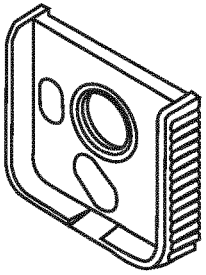
FIG. 8 shows pictorial representations of various top parts of examples of devices for use in fluid sample analysis.
Figure 8:
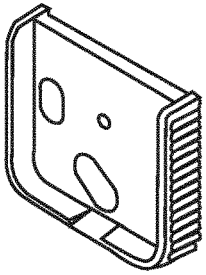
Figure 8:
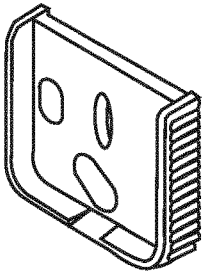
Figure 8:
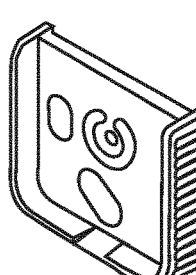
Figure 8:
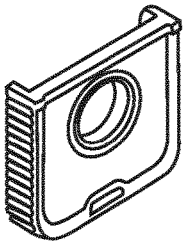
Figure 8:
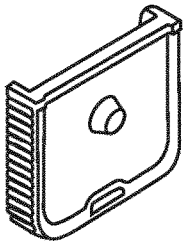
Figure 8:
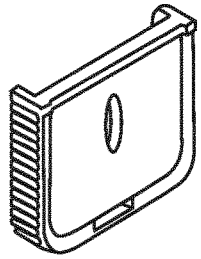
Figure 8:
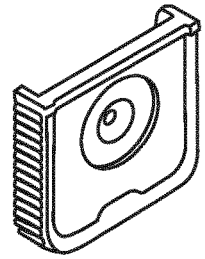
Figure 8:
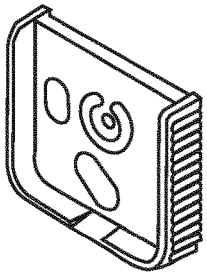
Figure 8:
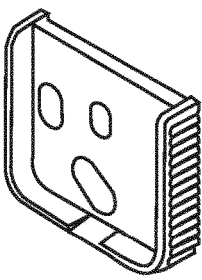
Figure 8:
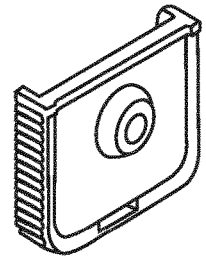
Figure 8:
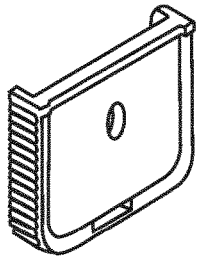

FIG. 7 shows the component parts of a device for use in fluid sample analysis. The filter housing forms a top part, and in this figure has a large opening and this top part is therefore replaced with one of the top parts B1, B2, C1, C2, or D as shown in FIG. 8. In FIG. 7, the dark circular disc is a membrane or filter, which is not now used. The blood platform base part (base part) is also shown and a blood platform laminate and blood platform RFID are also shown. As described, the filtering membrane is not used in the present device. In existing devices the membrane has a filtering function, and wetting of the membrane by blood or plasma is used to detect if a sample has been added. Detection in such existing devices is based on detecting a change in colour of the membrane and/or a change in reflectivity of the membrane upon wetting. In existing devices, using a filtering membrane, sample volumes of at least 35 μL are required. This large volume requirement in existing devices is caused by three effects: 1) in the case where whole blood samples are used (i.e. containing blood cells), a fraction of the sample volume (blood cells, which can amount to 55% of the sample volume) cannot pass through the membrane due to its filtering function; 2) when filtering the sample, the membrane starts to clog, as the pores get filled with blood-cells, which reduces the capillary pressure at the cartridge inlet, which slows down the filling velocity of the cartridge; 3) the membrane acts as a sponge and absorbs a significant amount of the sample fluid which it will not release to the cartridge.

Now, in the present device, which has been designed such that a filter is not required, by removing the membrane there is no membrane to filter the sample, slow down cartridge filling or absorb a significant amount of the sample volume. Therefore, in the present device without a membrane it is found that only 3 μL is needed to fill the cartridge (device). Such a decrease in sample volume enables smaller sample volumes to be extracted from patients, which is desirable from a usability point of view. Also, the present device design without a membrane increases robustness of the operability of the system, since the probability that a sample of too small a volume being supplied to the device is minimised. Another advantage of removing the membrane is a faster cartridge filling time, which can be used to reduce the time to an analysed result. Existing cartridges with a membrane take approximately 80 seconds to fill, but in the present device design without a membrane this can be lowered to approximately 30 seconds. For point of care testing, short lead times and small sample volumes are important.

FIG. 8 shows a number of top parts of devices for use in fluid sample analysis. Images A show the front and back of an existing design for use with a filtering membrane, as discussed above. Images B1, B2, C1, C2, and D show the front and back of examples of the top parts of the present device, which has been designed such that a filtering membrane is not required. The top parts B1 and B2 have a small circular opening, matched to the size of the pipette used to supply the sample; in other words guides and fits the sample application device. The outer part of the top parts B1 and B2 have a raised dome around the opening to aid guidance of the pipette and provide for the creation of a suction capillary action as well as enable the fluid sample to be supplied at increased pressures without flowing back out of the device as the sample is supplied. The small opening size, in addition to providing a large reflecting surface on the underside of the top part to enable radiation to be directed back and forth through the region the sample can move across due to capillary action, also means that the sample is supplied centrally to the sample inlet and at the correct position for the entrance of the capillary channel (shown in FIG. 9). The small sized opening also means that the sample is centrally supplied within the opening, and therefore spreads evenly over the fluid receiving surface and with the addition of the correct amount of fluid fill the space up to the vent ring (shown in FIG. 9) without flowing into the vent ring. On the underside of the top part shown in image B2, a horseshoe shaped confinement protrusion is provided to better confine the fluid. The opening of the horseshoe is in the direction of the capillary channel. Design D has a slightly larger opening than the designs B1 and B2 to enable the pipette to be more easily inserted and enables interfacing with other methods of sample application (e.g. a dispenser instead of a capillary tube or pipette), with designs C1 and C2 again having slightly larger openings than that for B1 and B2, but in the form of an oval or elliptical opening in order to guide the sample application device (to orient along the long axis of the oval shape) but not to exactly fit it. The long axis of the oval is in the direction of the capillary channel, with design C2 having a smaller oval than C1 to help prevent sample addition to the vent ring. The smaller hole of design D, in addition to increasing reflectivity as discussed above, also ensures sample application near to the inlet capillary channel that transfers the sample to the reaction chamber for analysis, in order to mitigate the non-filling of the device due to the sample not being transferred to the reaction chamber.

Figure 9:
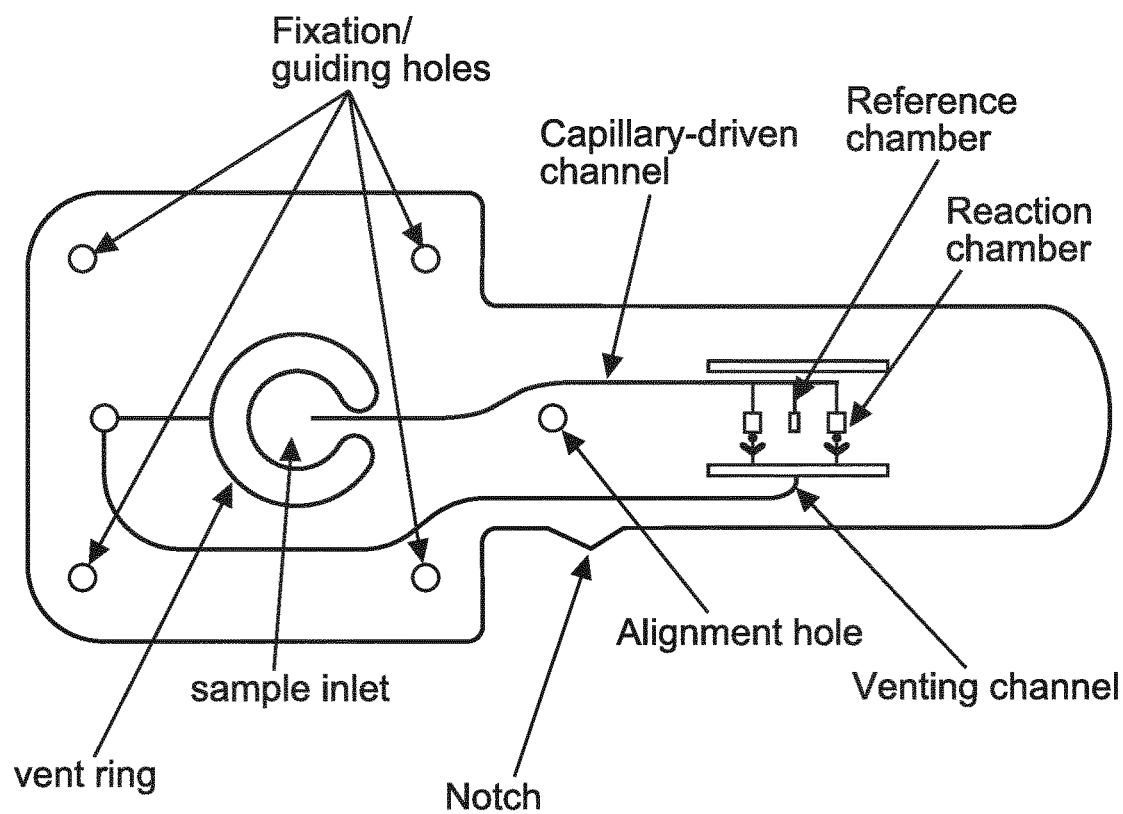
FIG. 9 shows a pictorial representation of a base part of an example of a device for use in fluid sample analysis.

FIG. 9 shows the base part of a device for fluid analysis that does not need a filtering membrane. The top part of the device (not shown) is positioned over the base part, such that the opening in the top part is centred over the horseshoe shaped vent ring. The capillary driven channel transfers sample that is supplied at the sample inlet to the analysis section comprising reaction and reference chambers. The two reaction chambers are filled with the sample fluid, and analysis of the sample fluid is undertaken. A pipette (or capillary tube) is used for transferring or supplying the sample through the opening in the top part of the device to the sample inlet. The capillary tube tip is directed towards the sample inlet, since the sample fluid must be in contact with the sample inlet to enable filling of the cartridge (device). The designs C1 and C2 (see FIG. 8) have oval shaped openings that prevents the sample from being applied to the left or right of the sample inlet. In that way, it provides some guidance to the position of the capillary tube (pipette) when applying the fluid sample to the cartridge. In this manner sideways misalignment is prevented, whilst forwards and backwards movement to a certain extent along the axis of the capillary channel at the sample inlet is provided. Designs B and D (see FIG. 8) with a small circular hole again reduce misalignment, with the pipette or capillary tube also been guided in the forward or backward position as well a sideways with respect to the inlet. The vent ring is provided for the venting of air, which prevents air bubble formation at the inlet, where such air bubbles can prevent cartridge filling. The vent ring also helps to confine the fluid within the fluid receiving surface defined within the vent ring. This is similar to the protrusion shown on the bottom surface of the top part B2 as shown in FIG. 8. If too much fluid sample is supplied the sample can flow into the vent ring, which can compromise the ability for the venting of air. The protrusion on the bottom surface of the top part B2 helps to prevent this. However, ideally the applied fluid sample fills the space defined by the confines of the vent ring between the base part and the blood housing (top part).

When the device (cartridge) is placed on the cartridge platform of the analyser (see FIG. 5) the cartridge platform is below the base part as shown in FIG. 9. Radiation from the light source then passes through the base part within the area defined by the vent ring, which is transparent, or at least partially transparent, to the radiation emitted by the light source. This radiation propagates to and is reflected from a radiation receiving area on the underside of the top part of the device and again passes through the base part within the area defined by the vent ring. This radiation propagation route is directed towards the right-hand side of the area defined by the vent ring as shown in FIG. 9, towards the opening of the vent ring and in the direction of the capillary driven channel. In this manner, detection of fluid that has moved between the base part and the top part under capillary action means that not only is the fluid flowing but it has flowed in the direction of the capillary driven channel, and therefore is more likely to have propagated down that channel to the analysis zone. However, the radiation can be directed at other areas defined within the vent ring. The surface of the base part within the confines of the vent ring is flat and the material is hydrophobic. This means that the blood sample does not stick to the base part, but is able to flow across the base part between the base part and the top part under capillary action. This then defines what is meant by "flatness" of the surface, with this meaning that the surface does not have a roughness that inhibits to any great extent the flow or movement of the fluid. Similarly, the bottom surface of the top part of the cartridge (device) corresponding to the area over which the fluid sample flows is flat and material is hydrophobic. This aids the flow or movement of the sample, and the radiation receiving surface is then located within this flat region on the underside of the top part and this enhances or increases the reflectivity of the surface. In examples, the material need not be classed as hydrophobic, but can still permit flow or movement of the fluid sample. The reflectivity of the surface is further increased over the radiation receiving surface through that area been coloured white. This is a very cost-effective way of increasing reflectivity, however other means of increasing reflectivity could be used such as a mirrored area or an area having a reflectivity specifically tuned to the wavelength(s) of the light source.

Figure 10:
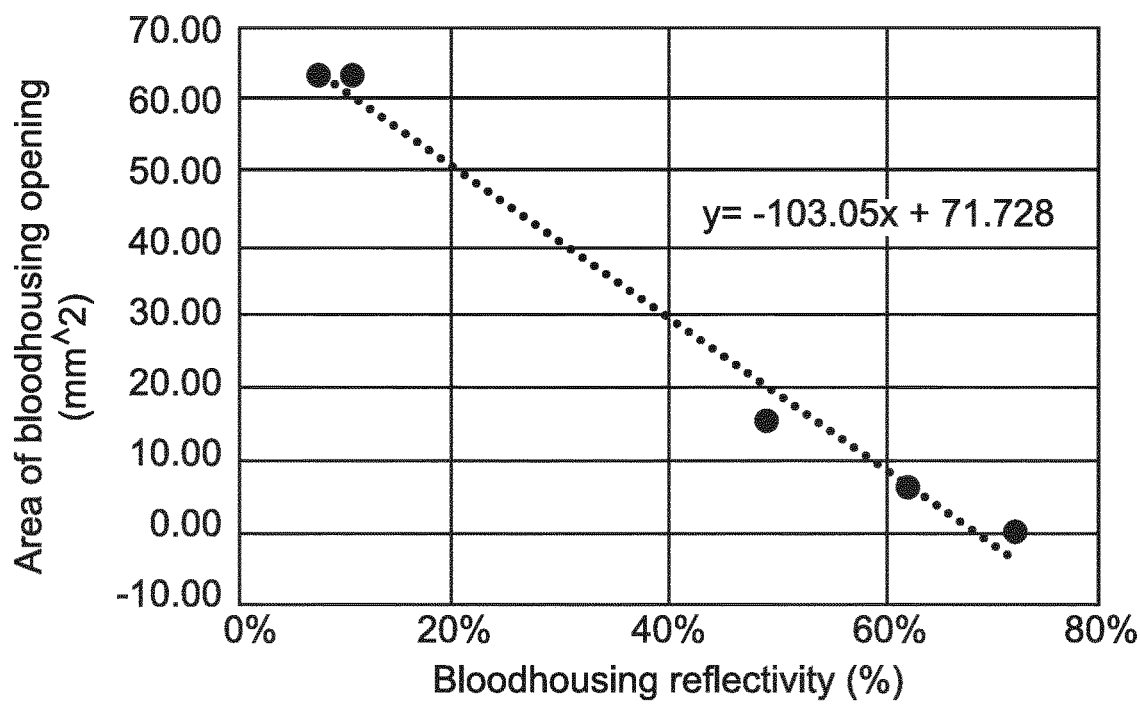
FIG. 10 shows a graphical representation of an example of the measurable change in reflectivity of the device.

FIG. 10 shows the reflectivity change for devices with different sizes of the through opening. The detector used was a standard CCD, but could be another standard detector such as a CMOS detector. The change in reflectivity as shown in FIG. 10 is representative of the contribution of the different components of the device, including the blood within the device. This indicates that a change of reflectivity of 5% is measureable as a clearly detectable change, and this can be equated to a movement of blood over the fluid receiving region to increase the area of blood by approximately 5 $mm^2$. However, in the tests the blood only covered half of the fluid receiving region in each case, and as such a movement of blood over an area of 2.5 $mm^2$ therefore leads to the clearly detectable reflectivity change of 5%. Indeed, reflectance changes of 1% are possible, equating to a movement of blood over the fluid receiving region of approximately 0.5 $mm^2$.

In the above description, a blood fluid sample has been described, however the device can be used for other fluid samples such as urine, plasma, water (with contaminants), and used for assays such as for melatonin, for Jazz-materials, HNL detection. The spacing between the top part and base part of the device can be adjusted depending upon the fluid type being analysed, in order that the fluid flows between these parts under capillary action as required.

In another exemplary embodiment, a computer program or computer program element is provided for controlling an appropriate system that is characterized by being configured to execute the method steps according to one of the preceding embodiments.

The computer program element might therefore be stored on a computer unit, which might also be part of an embodiment. This computing unit may be configured to perform or induce performing of the steps of the method described above. Moreover, it may be configured to operate the components of the above described apparatus. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Furthermore, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A device for use in fluid sample analysis, comprising:
   a top part;
   a base part;
   wherein, the top part is configured to be positioned adjacent to the base part so as to define a fluid receiving region in between;
   wherein, the top part has a through opening so as to enable fluid connection with the fluid receiving region;
   wherein, the base part comprises a fluid receiving surface and a radiation window extending from at least a part of the fluid receiving surface;
   wherein, the top part is positioned adjacent to the base part, the device is configured such that a fluidic sample supplied through the opening is moved laterally in the fluid receiving region over the fluid receiving surface without the use of an intermediary membrane;
   wherein, the device further comprises a radiation receiving area defined by a bottom surface of the top part that is at least partially reflective to at least one wavelength of the radiation, positioned such that at least a part of the fluid receiving region is located between the radiation receiving area and the fluid receiving surface when the top part is positioned adjacent to the base part.

2. Device according to claim 1, wherein, a centre of the opening defines a first axis substantially perpendicular to a bottom surface of the top part; and wherein, a centre of the radiation receiving area defines a second axis substantially perpendicular to the bottom surface of the top part; and wherein when the top part is positioned adjacent to the base part a distance separating the first axis from the second axis is greater than a distance separating the first axis from an inner edge of the opening.

3. Device according to claim 1, wherein, an area of a bottom surface of the top part defines the radiation receiving area.

4. Device according to claim 1, wherein the fluid receiving region is configured such that lateral movement of a fluidic sample is at least partly induced by a capillary force.

5. Device according to claim 4, wherein the fluid receiving region is configured such that lateral movement of a fluidic sample is at least partly induced by a sucking action without the use of an active pump.

6. Device according to claim 5, wherein a sample container is provided on a bottom surface of the top part or on a top surface of the base part, such that the fluid receiving region is a substantially parallel sided volume defined by the bottom surface of the top part, the top surface of the base part, and the sample container.

7. Device according to claim 6, wherein the opening is circular.

8. Device according to claim 6, wherein the opening has a width that is greater than a length.

9. Device according to claim 8, wherein the opening has a cross sectional area substantially matched to the cross sectional area of a sample delivery device.

10. Device according to claim 9, wherein the fluid receiving surface has an area, and the opening has a cross sectional area substantially less than the area of the fluid receiving surface.

11. A system for fluid sample analysis, comprising
    a radiation source;
    a device for use in fluid sample analysis according to claim 1;
    a radiation detector; and
    a processing unit;
    wherein, the radiation source is configured to provide the radiation;
    wherein, the radiation detector is configured to detect a radiation reflected from the radiation receiving area; and
    wherein, the processing unit is configured to determine the presence of a fluidic sample within the device on the basis of a reflectance value derived from the radiation reflected from the radiation receiving area.

12. System according to claim 11, wherein the reflectance value is determined on the basis of an intensity of radiation when a sample has not been supplied to the device and a detected intensity of radiation when a sample has been supplied to the device.

13. A method for use in fluid sample analysis, comprising:
    positioning a top part of a fluidic device adjacent to a base part of the fluidic device so as to define a fluidic receiving region in between, the top part being provided with a through opening fluidly connected to the fluidic receiving region, and the bottom part being provided with a radiation window adjacent to the fluidic receiving region;
    supplying a fluidic sample through the opening;
    moving the fluidic sample laterally in the fluid receiving region without the use of an intermediary membrane between the top part and the base part;
    emitting a radiation to the fluid receiving region through the bottom part;
    detecting a radiation that is reflected by the device out through the bottom part; and
    determining a presence of the fluidic sample on the basis of a measured reflectance value based on the detected radiation.

14. Method according to claim 13, wherein, an area of a bottom surface of the top part defines a radiation receiving area which is at least partly reflective to the wavelengths of the radiation.

15. A computer program element for controlling a device or system, which when executed by a processor is configured to carry out the method of claim 13.

* * * * *